(12) United States Patent
Pettersson

(10) Patent No.: US 7,972,253 B2
(45) Date of Patent: Jul. 5, 2011

(54) PRESSURE COMPENSATING DEVICE FOR A ROLLER

(75) Inventor: Björn Pettersson, Vallda (SE)

(73) Assignee: Aktiebolaget SKF, Göteborg (DE)

( * ) Notice: Subject to any disclaimer, the term of this patent is extended or adjusted under 35 U.S.C. 154(b) by 1087 days.

(21) Appl. No.: 11/543,923

(22) Filed: Oct. 6, 2006

(65) Prior Publication Data

US 2007/0082796 A1 Apr. 12, 2007

(30) Foreign Application Priority Data

Oct. 7, 2005 (SE) ...................................... 0502208

(51) Int. Cl.
*B21B 13/02* (2006.01)
(52) U.S. Cl. ........................ 492/4; 492/1; 492/7; 492/16
(58) Field of Classification Search .................. 492/1, 6, 492/7, 16, 51, 4
See application file for complete search history.

(56) References Cited

U.S. PATENT DOCUMENTS

| | | | | |
|---|---|---|---|---|
| 4,089,094 | A | * | 5/1978 | Kaira .................................. 492/7 |
| 6,641,513 | B1 | * | 11/2003 | Ward et al. ....................... 492/59 |
| 2005/0133190 | A1 | * | 6/2005 | Axelsson et al. ............. 164/448 |
| 2006/0045405 | A1 | | 3/2006 | Pettersson et al. | |

FOREIGN PATENT DOCUMENTS

SE 526 177 C2 9/2004

OTHER PUBLICATIONS

U.S. Appl. No. 11/210,747, filed Aug. 25, 2005.

* cited by examiner

*Primary Examiner* — David P Bryant
*Assistant Examiner* — Christopher Besler
(74) *Attorney, Agent, or Firm* — Buchanan Ingersoll & Rooney PC

(57) ABSTRACT

A pressure compensating device or arrangement for a roller arrangement which includes a central, non-rotating shaft provided with spaced apart bearings positioned adjacent opposite axial ends of the shaft and rotatably supporting at least one tubular roller segment, and where sealing arrangements are provided outside the bearings for sealing off the space inside the bearings and between the shaft and the roller segment towards the environment. The pressure compensating device includes a longitudinal bore extending from one end of the shaft and through at least a part thereof, with the bore communicating with the space between the sealing arrangements via channels. The bore is provided with a flexible member preventing direct communication between the exterior and the space between the sealing arrangements.

17 Claims, 2 Drawing Sheets

PRESSURE COMPENSATING DEVICE FOR A ROLLER

FIELD OF THE INVENTION

This flexible member 12 can be a membrane positioned near the opening of the bore 9, or as illustrated a flexible hose which has a closed end portion positioned adjacent the inner end of the bore 9, with its opposite end being open and attached to the entrance or open end of the bore 9 in order to allow the hose to communicate with the ambient air or exterior. The membrane or hose 12 can be made of rubber or an appropriate plastic material. The membrane extends across the bore 9, with a first side 12a of the membrane facing the bore, and a second, opposite side 12b of the membrane facing away from the bore.

BACKGROUND DISCUSSION

The rollers in a roller bed of a continuous casting machine operate in an adverse environment with high temperature, water, oxide scales and steam, which is generated when the water is used for cooling the hot casting strands, which are shaped, transported and cooled on the roller bed, where every roller is subdivided in several roller segments. This puts very high demands on the sealing arrangements for the bearings in which these roller segments are supported on the shaft common for several or all roller segments. A further complication is the temperature variations to which the rollers are subjected. The volume of air trapped in the gap between a roller segment having a length of about 60 cm and the intermediate sleeve, which is disposed between the shaft and the roller segment, can amount to about half a liter, and the increase in volume this air will experience when heated by the hot casting strands can result in a strong pressure influence on the bearing seals in the absence of devices which could take up such volume increases.

It has been proposed in the past to build bellows-formed compensating devices in or in the vicinity of the bearing housings. Such a solution is presented in SE 526 177 C2. However, at the top rollers of a roller bed, it is quite difficult to use such a solution for space reasons.

SUMMARY

A roller arrangement embodying a pressure compensating device as disclosed herein includes at least one tubular roller segment, a central, non-rotating shaft provided with spaced apart bearings positioned adjacent opposite axial ends of the shaft and rotatably supporting the at least one tubular roller segment, sealing arrangements provided outside the bearings to axially seal off a space between the bearings and between the shaft and the at least one tubular roller segment, and a pressure compensating device that comprises a longitudinal bore in the shaft which is open at least at one end to communicate the bore with the exterior. The bore extends through at least a part of the shaft and communicates with the space between the sealing arrangements via channels. A flexible member is provided in the bore to prevent direct communication between the exterior and the space between the sealing arrangements.

According to another aspect, a roller arrangement comprises a rotationally fixed shaft, at least one tubular roller segment rotatably supported on the rotationally fixed shaft by spaced apart bearings positioned adjacent opposite axial ends of the shaft, a space between an inner surface of the least one tubular roller segment and an outer surface of the rotationally fixed shaft, sealing arrangements axially outside each of the bearings to axially seal off the space from exterior of the roller arrangement, and a bore in the shaft. The bore extends along at least a portion of an axial extent of the shaft, possesses an open end that is open to the exterior of the roller arrangement, and communicates with the space that is axially sealed off from the exterior of the roller arrangement. In addition, a flexible member is provided in the bore of the shaft.

BRIEF DESCRIPTION OF THE DRAWING FIGURES

Additional features and characteristics of the subject matter disclosed herein will be described below in more detail with reference to the accompanying drawing figures briefly described below.

DETAILED DESCRIPTION

Figure 1:
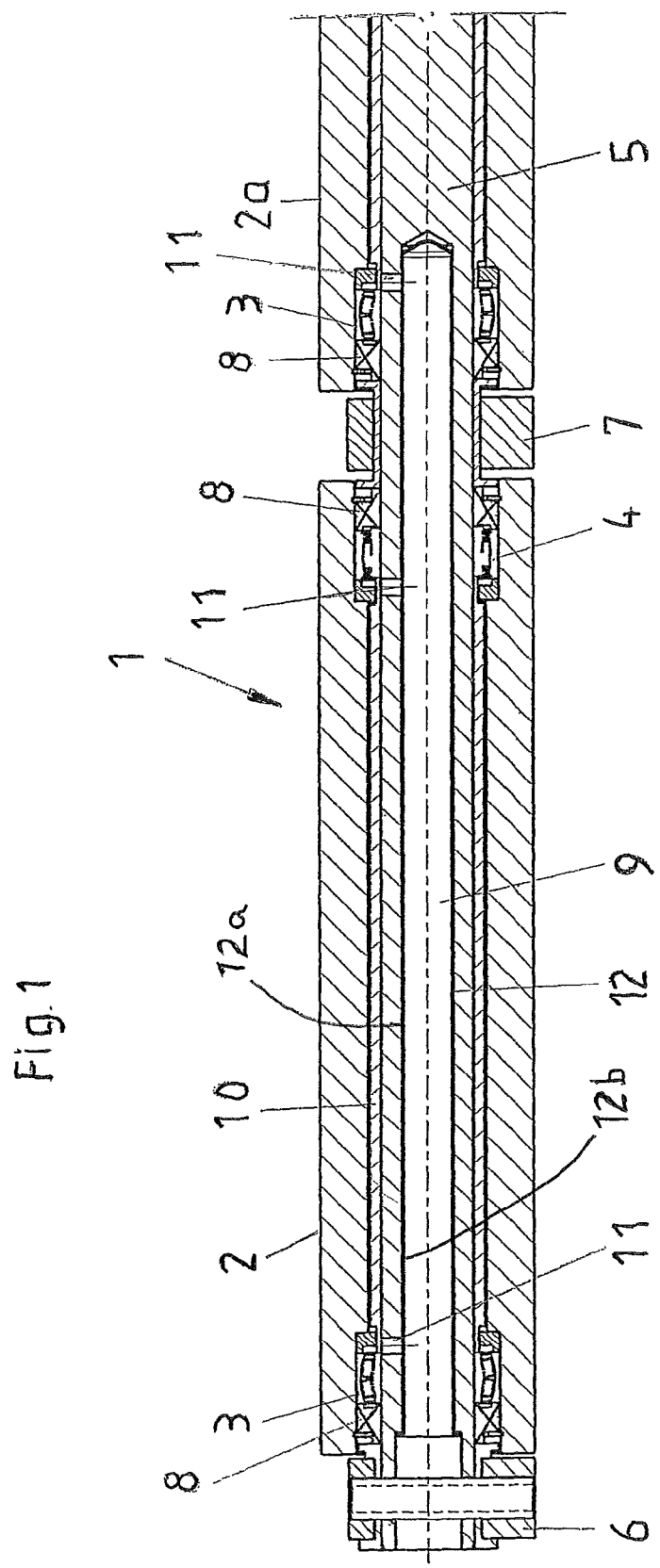
FIG. 1 is a cross-sectional view of a portion of a roller of a roller bed for a continuous casting machine, with one roller segment and part of an adjoining roller segment.

Referring to FIG. 1, a roller or roller arrangement 1 of a roller bed for a continuous casting machine incorporates a number of roller segments 2, 2a, each rotatably supported in respective bearings 3, 4 on a common shaft 5. The common shaft 5 is non-rotatably supported in stands 6, 7. FIG. 1 illustrates one complete roller segment 2 and a portion of a second roller segment 2a. A bearing 3, 4 is positioned near each end of each roller segment 2, 2a, and a sealing cassette 8 is arranged outside each bearing 3, 4.

As mentioned above, these sealing cassettes 8 are subjected to varying pressures under influence from the hot casting strands or slabs transported on the roller bed. To help provide that the sealing members incorporated in the sealing cassettes are not pulled inwards or pressed outwards under influence of the temperature variations in a manner that could cause moisture and contaminants to enter the bearings situated inside the sealing cassettes, a pressure compensating device is provided. In the embodiment illustrated, this pressure compensating device is common for bearings 3, 4, 3 in three different positions. However, each compensating device could be used for one or more bearing positions.

An intermediate sleeve 10 is provided around the shaft 5 and inside each roller segment 2, 2a. The intermediate sleeve 10 is in contact with the shaft 5, but is spaced with a relatively narrow clearance from the roller segment. This intermediate sleeve 10 contacts and spaces apart the inner rings of the two bearings in each roller segment.

The non-rotating shaft 5 is provided with a bore 9 which is concentric with the outer peripheral surface (outer envelope surface) of the shaft, and extends through a part of the shaft 5. In the illustrated embodiment, this bore 9, which includes an entrance or opening communicating the bore with the ambient air, extends axially over the entire length of the first roller segment 2 and over a part of the second roller segment 2a. Thus, in the illustrated embodiment, the axial extent of the bore 9 is greater than the axial extent or length of one of the roller segments The bore 9 ends at a position inside the sealing cassette 8 situated outside the first bearing 3 in the second roller segment 2a in the manner illustrated.

This bore 9 communicates, via a number of radial through channels 11 extending from the bore 9 to the exterior surface of the shaft 5, with the chambers where the bearings 3, 4 are situated. The bore 9 via the channels 11 is thus in communication with the space between the two sealing cassettes 8 and thus also the relatively narrow clearance between the intermediate sleeve and the inner peripheral surface of the roller segment 2, 2a.

When air entrapped in this space is heated as a result of the contact between the exterior of the roller segment and the hot casting strands or slabs transported on the roller bed, the volume of this air will increase. Because this space communicates via the channels 11 with the bore 9, this increase in volume will not result in a steep increase in the pressure acting on the sealing cassettes 8. The risk of forces acting to urge the sealing members to open is thereby significantly reduced or possibly eliminated.

To help avoid the risk that moisture and contaminants can reach the interior of the bearing chambers via the bore 9 in the shaft 5 and the radial channels 11, the bore 9 is provided with a flexible member 12, preventing moisture and foreign matter from reaching the interior of the roller segments.

This flexible member 12 can be a membrane positioned near the opening of the bore 9, or as illustrated a flexible hose which has a closed end portion positioned adjacent the inner end of the bore 9, with its opposite end being open and attached to the entrance or open end of the bore 9 in order to allow the hose to communicate with the ambient air or exterior. The membrane or hose 12 can be made of rubber or an appropriate plastic material.

Although not illustrated, there can if desired be positioned a restriction at the open end of the hose 12.

In the drawing figure, the bearings illustrated have been shown as a self-aligning spherical roller bearing 3 and a toroidal roller bearing 4, but the type of bearings are not limited in this regard as the pressure compensating device has useful application with other bearings.

As the illustrated and described pressure compensating device is arranged inside the shaft 5 on which the roller segments are supported, the device can be housed in arrangements having relatively limited space without significant difficulty. For this reason, the described solution is particularly suited for use in the top roller segments of a roller bed for a continuous casting machine. However, the solution can of course also be used in other types of rollers or roller segments.

The invention is not limited to the embodiment shown in the accompanying drawing figure and described in connection thereto, but modifications and variants are possible within the scope of the accompanying claims. Although the concentric bore 9 in the shaft has been shown to extend along three bearing positions, this is not critical and the bore may for instance extend over more or less than three bearing positions.

Figure 2:
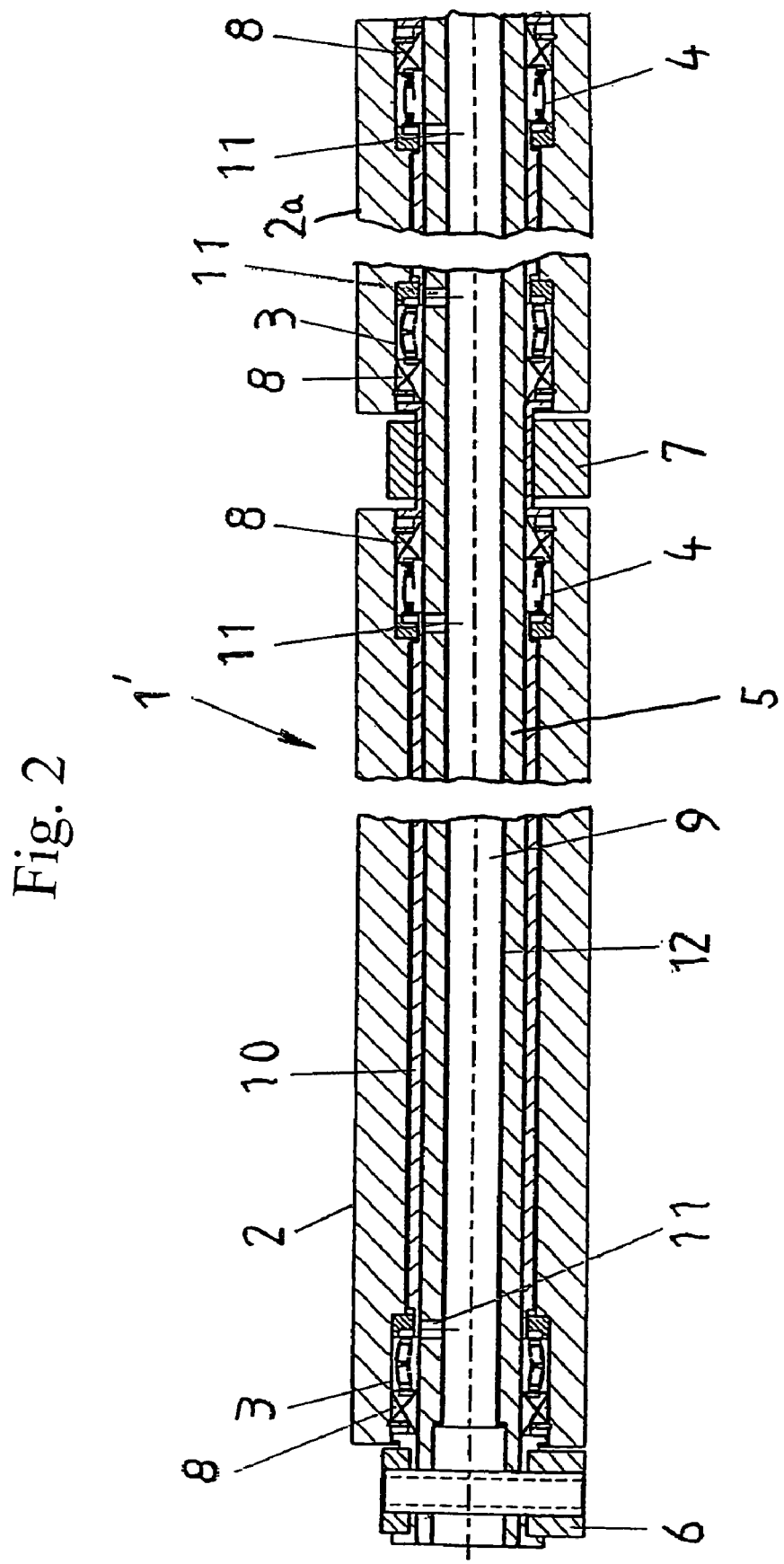
FIG. 2 is a cross-sectional view of a portion of a roller arrangement of a roller bed for a continuous casting machine illustrating an alternative embodiment.

As an alternative to the solution illustrated with a bore extending through a part of the shaft and having a hose or flexible member, which is closed at one end and has its opposite end open communicating with the outer atmosphere, it is also possible to use a tubular shaft which is open at both ends and provided with a flexible member that is open at both ends and sealingly attached to the inner surface of the bore (e.g., at opposite ends) so that the interior of the hose communicates with the atmosphere at both ends whereas the exterior surface thereof is subjected to pressure variations in the space between the sealing arrangements. Such an alternative roller arrangement 1' is shown in FIG. 2, it being understood that only portions of the two roller segments 2a, 2b are shown and that details associated with the shaft support at the right end are not included, though a stand similar to that shown at the left end can be provided.

The principles and preferred embodiment(s) have been described in the foregoing specification. However, the invention which is intended to be protected is not to be construed as limited to the particular embodiment(s) disclosed. Further, the embodiment(s) described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A roller arrangement comprising:
   a rotationally fixed shaft;
   at least one tubular roller segment rotatably supported on the rotationally fixed shaft by spaced apart bearings positioned adjacent opposite axial ends of the shaft;
   a space between an inner surface of the least one tubular roller segment and an outer surface of the rotationally fixed shaft;
   sealing arrangements axially outside each of the bearings to axially seal off the space from atmosphere surrounding the roller arrangement;
   a bore in the shaft and extending along at least a portion of an axial extent of the shaft, the bore possessing an open end that is open to atmosphere surrounding the roller arrangement, a passage communicating the bore with the space that is axially sealed off from atmosphere surrounding the roller arrangement; and
   a flexible member in the bore of the shaft arranged to extend across the passage and having an open end which communicates an interior of the flexible member with atmosphere surrounding the roller arrangement, wherein the flexible member prevents communication of the passage with atmosphere surrounding the roller arrangement.

2. The roller arrangement according to claim 1, wherein the at least one roller segment comprises at least two roller segments rotatably supported on the shaft, the bore extending axially through the shaft to such an extent that an axial extent of the bore spans portions of both of the at least two roller segments, the flexible member being sealingly attached to an interior surface of the bore adjacent at least one end of the bore.

3. The roller arrangement according to claim 1, wherein the bore is open at opposite ends, and the flexible member is sealingly attached to an interior surface of the bore adjacent the opposite ends of the bore.

4. The roller arrangement according to claim 1, wherein the flexible member is a membrane positioned in the bore near the open end of the bore.

5. The roller arrangement according to claim 1, wherein the passage comprises at least one channel extending through a wall of the shaft.

6. The roller arrangement according to Claim 5, wherein there is a plurality of the channels.

7. The roller arrangement according to claim 1, wherein the flexible member is a flexible hose and has a closed end, the flexible hose being fitted to an inner periphery of the bore adjacent the open end of the flexible hose.

8. The roller arrangement according to claim 1, wherein the longitudinal bore is concentric with the shaft.

9. The roller arrangement according to claim 1, further comprising a sleeve positioned between the inner surface of the at least one roller segment and the outer surface of the rotationally fixed shaft, the space being located radially between the inner surface of the at least one roller segment and an outer surface of the sleeve.

10. The roller arrangement according to claim 1, wherein the sleeve comprises opposite axial ends each of which contacts one of the bearings.

11. A roller arrangement comprising:

at least one tubular roller segment;

a central, non-rotating shaft provided with spaced apart bearings positioned adjacent opposite axial ends of the shaft and rotatably supporting the at least one tubular roller segment;

sealing arrangements provided outside the bearings to axially seal off a space between the bearings and between the shaft and the at least one tubular roller segment; and a pressure compensating device comprising a longitudinal bore in the shaft which is open at least at one end to communicate the bore with atmosphere surrounding the roller arrangement, the at least one bore extending through at least a part of the shaft, a passage communicating the bore with the space between the sealing arrangements via channels, and a flexible member provided in the bore to prevent direct communication between atmosphere surrounding the roller arrangement and the space between the sealing arrangements, wherein the flexible member is arranged to extend across the passage and has an open outer end which communicates an interior of the flexible member with atmosphere surrounding the roller arrangement.

12. The roller arrangement according to claim 11, wherein the at least one roller segment comprises at least two roller segments rotatably supported on the shaft, the bore extending axially through the shaft to such an extent that an axial extent of the bore spans portions of both of the at least two roller segments, the ends of the flexible member being sealingly attached to the interior surface of the bore adjacent at least one end of the bore.

13. The roller arrangement according to claim 11, wherein the flexible member is a membrane positioned in the bore near the open end of the bore.

14. The roller arrangement according to claim 11, wherein the flexible member is a flexible hose and has a closed inner end, the flexible hose being fitted to an inner periphery of the bore adjacent the open outer end.

15. The roller arrangement according to claim 11, wherein the longitudinal bore is concentric with the shaft.

16. The roller arrangement according to claim 11, wherein the bore is open at opposite ends, and the flexible member is sealingly attached to an interior surface of the bore adjacent the opposite ends of the bore.

17. A roller arrangement comprising: a rotationally fixed shaft;

at least one tubular roller segment rotatably supported on the rotationally fixed shaft by spaced apart bearings positioned adjacent opposite axial ends of the shaft;

a space between an inner surface of the least one tubular roller segment and an outer surface of the rotationally fixed shaft;

sealing arrangements outside each of the bearings to axially seal off the space;

a bore in the shaft and extending along at least a portion of the shaft, the bore possessing an open end that is open to atmosphere surrounding the roller arrangement, a passage communicating the bore with the space that is axially sealed off;

a flexible member in the bore of the shaft arranged to prevent communication of the passage with atmosphere surrounding the roller arrangement; and wherein the flexible member has an open end which communicates an interior of the flexible member with atmosphere surrounding the roller arrangement.

\* \* \* \* \*